Patented Sept. 29, 1953

2,653,419

UNITED STATES PATENT OFFICE 2,653,419

METHOD OF MAKING ANNEALED COPPER RUBY GLASS ARTICLES

Ralph F. Brenner and Paul D. Dilliard, Lancaster, Ohio, assignors to Anchor Hocking Glass Corporation, Lancaster, Ohio, a corporation of Delaware No Drawing. Application June 16, 1949, Serial No. 99,590

2 Claims. (Cl. 49—88)

The present invention relates to ruby glass and the annealing art and more particularly to a method of annealing glass of a particular composition to produce a glass having ruby color of the desired shade therein.

Glass is customarily annealed in a relatively long lehr where the glass is brought to an annealing temperature which relieves the internal stresses developed during the fabricating operations. Due to limitations in temperature controls and due to drafts of outside air passing through the lehr occasioned by the necessity of having both ends of the lehr open, it is difficult to maintain exact temperatures at various points in the lehr.

The present invention is concerned not so much with annealing to relieve the strains but to inducing changes in the color of the glass by heat to produce a proper ruby shade. More particularly, the invention relates to the annealing of glass of the compositions given in patents numbered 2,174,554 and 2,233,343, dated October 3, 1939, and February 25, 1941, respectively.

The following are examples:

Example 1

A glass batch is prepared containing the following ingredients:

| | Parts by weight |
|---|---|
| Sand | 110 |
| Potassium carbonate | 10 |
| Sodium carbonate | 40 |
| Calcium oxide | 13 |
| Aluminum oxide | 3.5 |
| Cuprous oxide | 0.25 |
| Stannous oxide | 0.32 |
| Sodium cyanide | 1.25 |

Example 2

A similar ruby glass is obtained by substituting cuprous cyanide in place of cuprous oxide in the glass batch given in Example 1. In this case, less sodium cyanide need be used since the cuprous cyanide serves as part of the addition agent as well as the source of copper.

Metal cyanates or cyanamides may be used with good results in place of the sodium cyanide in Example 1 although the metal cyanides, particularly the alkali metal cyanides, are somewhat superior thereto and are preferred. In general, the presence of calcium oxide and aluminum oxide in the batch is desired in that these substances tend to improve the color of the final product. The presence of stannous oxide, although not essential, is generally desirable in that it improves the color striking property of the glass. Aluminum oxide also causes the color to strike more readily and this effect appears to increase somewhat as the proportion of aluminum oxide is increased.

The particular cyanogen compound or mixture of such compounds that is best employed in a glass batch will depend upon the other batch ingredients as well as upon the color requirements of the desired ware. The alkali metal cyanides, e. g. sodium cyanide, are generally suitable for use in any copper ruby glass batch and their use is generally preferred in that it does not involve the introduction of metallic constituents which impart color to the glass.

As has been pointed out above, ingredients such as calcium oxide, aluminum oxide and stannous oxide tend to modify somewhat the final color as well as also to affect somewhat the rate of color development. It may be said, however, that an amount of cyanogen compound not exceeding about 1 to 2 parts per 100 parts of sand is sufficient to produce generally satisfactory results, although larger amounts, e. g. amounts equal to 5 to 10 parts by weight of the batch, may be used in specific cases.

The desired final ratio of basic to acidic constituents of the glass should be considered in connection with the amount of cyanogen compound to be used. When relatively large amounts of cyanogen compound are employed, e. g. amounts equal to from 5 to 10% of the weight of the batch, it may be necessary to increase the acidic ingredients, e. g. sand, of the batch in order to insure the desired ratio of basic to acidic constituents of the final glass. Relatively small amounts, e. g. 1 to 2 parts per 100 parts of sand, may generally be used without correspondingly adjusting the ratio of basic to acidic ingredients; however, such adjustment may be made if desired.

While the use of the above cyanogen compounds renders the melt less sensitive to the furnace atmosphere, it is generally necessary to employ an amount of cyanogen compound corresponding somewhat to the oxidizing strength of the furnace atmosphere. Thus, with a strongly oxidizing atmosphere, a relatively large amount of cyanogen compound is generally required. The beneficial effects of the cyanogen compound in the melt is, however, exerted over a prolonged period of time, e. g. for 1 to 2 days, so that relatively small amounts, e. g. 1 to 2 parts per 100 parts of sand, are generally sufficient even though the furnace atmosphere is slightly oxidizing.

There is usually no advantage in using more than, for example, about 0.5 part of cuprous oxide per 100 parts of sand and about 0.2 to 0.25 part gives generally satisfactory results. However, as little as 0.02 part of cuprous oxide may be used in conjunction with, for example, sodium cyanide to produce ware having a good ruby color. Copper compounds other than cuprous oxide, e. g. copper salts such as the carbonate, sulfate, chloride and the like, may be used although the oxide is preferred for reasons of economy.

In order to incorporate bismuth in the glass, we may add any suitable bismuth compound, for example, bismuth oxide, such as $Bi_2O_3$ or hydrates thereof, a bismuth salt, for example, the nitrate, subnitrate, sulfate, phosphate or carbonate. We prefer ordinarily not to use bismuth compounds which may affect the clarity or appearance of the glass, for example, halides and sulfides.

In general, excellent results may be obtained by adding such amount of bismuth or bismuth compound that the bismuth content of the finished glass corresponds to 0.01 to 0.3% of bismuth oxide ($Bi_2O_3$). In most cases, best results are obtained for the depth of ruby color usually desired when the bismuth content of the glass corresponds to 0.01 to about 0.04% by weight. For most practical purposes, in most cases the effect of the bismuth usually becomes small when the amount is decreased below 0.01% $Bi_2O_3$ in the finished glass, although smaller amounts of bismuth have an appreciable effect on the color developed. If too much of the bismuth compound is added the glass tends to acquire a dark brownish color which is usually undesired. In most cases such brownish color appears when the amount of bismuth is equivalent to more than 0.3% $Bi_2O_3$ in the finished glass. A good ruby color, without the formation of the brown color usually can be obtained if the amount of bismuth taken (calculated as $Bi_2O_3$) is not more than one-half the weight of copper (calculated as metallic copper) in the glass batch.

As a further example of the practice of our invention, we may utilize our preferred modification of the herein described invention, adding to the glass batch cuprous oxide, bismuth oxide or a suitable bismuth salt, e. g. the subnitrate, stannic oxide and sodium cyanide. These four ingredients are added to and mixed with conventional glass making ingredients such as silica, lime and soda ash. Various known formulas for making crystal glass of the soda-lime, borosilicate or other types may be utilized in this way. The four above named ingredients are mixed in and fused with the other ingredients of the formula chosen. Preferably they are added in the proportions indicated in the following tabulation where the percentages are based on the weight of the finished glass composition:

| | Per cent by weight |
|---|---|
| Cuprous oxide ($Cu_2O$) | 0.05 to 0.2 |
| Bismuth oxide ($Bi_2O_3$) | 0.01 to 0.03 |
| Stannic oxide ($SnO_2$) | 0.1 to 0.2 |
| Sodium cyanide (NaCN) | 0.4 to 0.9 |

While the above named specific compounds of copper, bismuth, tin and cyanogen may be preferably used, their chemical equivalents may be used if desired. For example, the copper, tin or bismuth may be added as metals (preferably in finely divided form) or as oxides or salts. In place of sodium cyanide, other metal cyanides may be used, e. g. an alkali metal cyanide such as potassium cyanide, an alkaline earth cyanide, such as calcium cyanide or copper cyanide. Other metal cyanides may be used provided they do not adversely affect the desired color in the glass. Glass of these compositions after it has been fabricated into the desired articles, such as tumblers, ash trays, etc., has a light green color. However, when heated at the proper temperature for the proper period, the color changes to a ruby shade.

If the shade is too dark, it is not acceptable commercially, and likewise if it is too light it is not salable as first-class merchandise. We have discovered that glass of a 2 mm. thickness which transmits 80% of light rays of a wave length of 690 m$\mu$ (red) gives the maximum ideal transmittance. In other words, if more than this amount of red light of this wave length is transmitted, the shade is too light. On the other hand, if the glass of 2 mm. thickness transmits less than 72% of similar wave lengths of light, the color is too dark. However, a transmission range as low as 68% of this wave length of light produces an acceptable minimum for commercial glass, but the desired range of transmittance is 72% to 80% of light of 690 m$\mu$.

The glass should filter out the wave lengths of light below the red range; that is, yellow light and those colors of a shorter wave length. The maximum permissible transmittance of yellow light (550 m$\mu$) should be about 16%.

We have also discovered in annealing glass to produce a ruby color that a period of twenty minutes gives optimum results in that maximum variations in temperature are permitted without producing an objectionable variation in color. When annealed for this period we have discovered that the color of the glass does not change appreciably over a range of 50° F. from 1100 to 1150° F. In other words, where the temperature is kept between this range—1100 to 1150° F.—the color will be approximately the same. Therefore, by regulating the lehr temperature as near 1125° F. as possible a temperature variation of plus or minus 25° is permissible without affecting materially the color of the glass. Furthermore, the time period may vary substantially without bringing the color outside the permissible range for commercial glassware. For example, if the time should vary as much as five minutes less than the twenty minutes; namely, fifteen minutes, the glass would be commercially salable insofar as color is concerned. Further, if the period should be increased by an additional five minutes; that is, to twenty-five minutes, the glass would be darker in color but not sufficiently dark as to be unsalable. These permissible variations in time are helpful because the glass has to be heated to the proper temperature, retained at the desired temperature for the specified period, and then cooled. The annealing period necessarily overlaps the heating and cooling periods, making it difficult to control accurately the annealing period. If substantially different temperatures or times are utilized, the above results are not achieved.

All of the above calculations are based on glass having a thickness of two millimeters. If a different thickness of glass is annealed, the difference in transmittance can be determined by well-known calculations, for example by the formula:

$$\log \frac{T_2}{(1-R)^2} = \frac{t_2}{t_1} \log \frac{T_1}{(1-R)^2}$$

where $T_1$ and $T_2$ are transmissions corresponding respectively to thicknesses $t_1$ and $t_2$, and R is determined from the Fresnel equation $$R = \frac{(n-1)^2}{(n+1)^2}$$

$n$ being the refractive index of the glass. Generally $(1-R)^2$ may be considered equal to 0.92.

It will be seen that the present method permits maximum variations in temperatures, periods of annealing and thickness of the glass with minimum variations in color. The production of off-color and unsalable glass is minimized or prevented and greater tolerances are allowed in the manufacturing operations.

As various changes may be made in the method without departing from the spirit of the invention, it is to be understood that all matter herein is to be interpreted as illustrative and not in a limiting sense.

Having thus described our invention, we claim:

1. The method of making annealed copper ruby glass articles which comprises providing a glass mix including sand, a copper compound in amount corresponding to 0.02 to 0.5 part of cuprous oxide per 100 parts of sand, and a metallic cyanogen compound selected from the group consisting of metal cyanides, cyanates and cyanamides, the cyanogen compound being present in amount corresponding to 1 to 9 parts of sodium cyanide per 100 parts of sand, melting said mix, fabricating said melted mix into a series of articles of light green coloring, and heating the said glass articles while conveying them in sequence through a lehr at temperatures from 1100° F. to 1150° F. for a period of from fifteen to twenty-five minutes to produce in each of said articles a ruby color transmitting 63% to 80% of light rays of a wave length of 690 m$\mu$ and not more than 16% of light rays of a wave length of 550 m$\mu$ when corrected for a glass thickness of about 2 mm.

2. The method of making annealed copper ruby glass articles which comprises providing a soda-lime glass mix containing a major proportion of silica and a minor proportion of a mixture of compounds including calcium oxide and aluminum oxide, a copper compound in amount corresponding to 0.02 to 0.5 part of cuprous oxide per 100 parts of silica, a bismuth compound, and a metallic cyanogen compound selected from the group consisting of metal cyanides, cyanates and cyanamides, the cyanogen compound being present in amount corresponding to 1 to 9 parts of sodium cyanide per 100 parts of silica and the bismuth compound being present in amount corresponding to 0.01 to 0.3% of bismuth oxide in the finished glass, melting said mix, fabricating said melted mix into a series of articles of light green coloring, and heating the said series of glass articles at temperatures from 1100° F. to 1150° F. while conveying them in sequence through a lehr for a period of from fifteen to twenty-five minutes to produce in each of said articles a ruby color transmitting 63% to 80% of light rays of a wave length of 690 m$\mu$ and not more than 16% of light rays of a wave length of 550 m$\mu$ when corrected for a glass thickness of about 2 mm.

RALPH F. BRENNER.
PAUL D. DILLIARD.

References Cited in the file of this patent

UNITED STATES PATENTS

| Number | Name | Date |
|---|---|---|
| 2,174,554 | Dobrovolny et al. | Oct. 3, 1939 |
| 2,233,343 | Dobrovolny et al. | Feb. 25, 1941 |
| 2,354,164 | Weil | July 18, 1944 |

OTHER REFERENCES

J. Soc. Glass Tech., vol. 29, 1945, pages 385, 386, 387.